(12) United States Patent
Pepper

(10) Patent No.: US 10,567,123 B2
(45) Date of Patent: Feb. 18, 2020

(54) METHODS, SYSTEMS AND COMPUTER READABLE MEDIA FOR EVALUATING LINK OR COMPONENT QUALITY USING SYNTHETIC FORWARD ERROR CORRECTION (FEC)

(71) Applicant: Keysight Technologies, Inc., Minneapolis, MN (US)

(72) Inventor: Gerald Raymond Pepper, Newbury Park, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 63 days.

(21) Appl. No.: 15/905,097

(22) Filed: Feb. 26, 2018

(65) Prior Publication Data

US 2019/0268110 A1  Aug. 29, 2019

(51) Int. Cl.
  *H04L 1/00*  (2006.01)
  *H04L 1/20*  (2006.01)
(52) U.S. Cl.
  CPC ............ *H04L 1/203* (2013.01); *H04L 1/0041* (2013.01); *H04L 1/0045* (2013.01)
(58) Field of Classification Search
  CPC .................................................... H04L 1/0057
  USPC ................................................ 714/776, 774
  See application file for complete search history.

(56) References Cited

U.S. PATENT DOCUMENTS

| | | | | |
|---|---|---|---|---|
| 5,710,781 A | * | 1/1998 | Zinser | ................... H04B 1/667 714/747 |
| 5,889,791 A | | 3/1999 | Yang | |
| 5,896,403 A | * | 4/1999 | Nagasaki | ......... G06K 19/06037 714/752 |

(Continued)

FOREIGN PATENT DOCUMENTS

EP    1 204 240 A2    5/2002

OTHER PUBLICATIONS

Mustafa et al, "Performance Evaluation of Variant Error Correction Schemes in Terms of Extended Coding Rates & BER for OFDM Based Wireless Systems," International Journal of Wireless Communications and Mobile Computing, vol. 4, Issue 1, pp. 7-11 (Jan. 2016).

(Continued)

*Primary Examiner* — Fritz Alphonse

(57) ABSTRACT

A method for evaluating link or component quality using synthetic forward error correction (FEC) includes generating a bit sequence. The method further includes transmitting the bit sequence over a link or through a component under test without adding FEC to the bit sequence. The method further includes receiving a bit sequence transmitted over the link or through the component. The method further includes determining locations of bit errors in the received bit sequence. The method further includes determining locations of synthetic FEC codeword and symbol boundaries in the received bit sequence for the synthetic FEC algorithm against which link or component quality is being evaluated. The method further includes identifying symbol and code- (Continued)

word errors for the synthetic FEC algorithm based on the locations of bit errors in received bit sequence. The method further includes outputting an indication of link or component quality based on the symbol and codeword errors identified for the synthetic FEC algorithm.

19 Claims, 6 Drawing Sheets

(56) References Cited

U.S. PATENT DOCUMENTS

| | | | | |
|---|---|---|---|---|
| 6,320,852 | B1* | 11/2001 | Obuchi | H04L 1/0047 370/230 |
| 6,684,351 | B1 | 1/2004 | Bendak et al. | |
| 8,838,722 | B2* | 9/2014 | Ridges | H04N 21/41407 709/204 |
| 10,236,907 | B2 | 3/2019 | Szczepanek et al. | |
| 2003/0106014 | A1 | 6/2003 | Dohmen et al. | |
| 2006/0245505 | A1 | 11/2006 | Limberg | |
| 2008/0065942 | A1* | 3/2008 | Pleasant | G01R 31/3172 714/746 |

OTHER PUBLICATIONS

Farrugia et al., "A Statistical Bit Error Generator for Emulation of Complex Forward Error Correction Schemes," IEEE, pp. 1-6 (2007).

Wikipedia, "Forward Error Correction," Wayback Machine, pp. 1-6 (Accessed Dec. 26, 2017).

Commonly-assigned, co-pending U.S. Appl. No. 16/453,941 for "Methods, Systems, and Computer Readable Media for Testing of Hardened Forward Error Correction (FEC) Implementations," (Unpublished, filed Jun. 26, 2019).

Commonly-assigned, co-pending U.S. Appl. No. 16/557,426 for "Methods, Systems, and Computer Readable Media for Generating Analog-Distorted Test Data," (Unpublished, filed Aug. 30, 2019).

"Anritsu Strengthens MP1900A BER Test Functions for More Efficient Verification of 400GbE Transceivers and DSP," Signal Integrity Journal, pp. 1-6 (Mar. 5, 2019).

"32 G/64 Gbaud Multi Channel PAM4 BERT," Anritsu envision: ensure, pp. 1-30 (Feb. 2019).

"Accelerating from 100GE to 400GE in the Data Center Advanced Modulation and Coding Challenges," Keysight Technologies, pp. 1-6 (Sep. 10, 2018).

* cited by examiner

METHODS, SYSTEMS AND COMPUTER READABLE MEDIA FOR EVALUATING LINK OR COMPONENT QUALITY USING SYNTHETIC FORWARD ERROR CORRECTION (FEC)

TECHNICAL FIELD

The subject matter described herein relates to evaluating link or component quality. More particularly, the subject matter described herein relates to evaluating link or component quality using synthetic FEC.

BACKGROUND

The testing of network equipment can include measuring how accurately the equipment can place data on a physical link and send the data to other network equipment over the link. Such measurement is often referred to as a link or component quality measurement, as it measures the quality of the physical link and the components used to transmit and receive data over the link. Examples of link components for which it may be desirable to evaluate quality include serializer/deserializers (SerDes), retimers, or other components used to place bits on a link or receive bits from a link One way in which link or component quality is measured is by counting the number of bit errors that occur over a given amount of time or per quantity of received data. If no error correcting codes are used on a link, measuring link or component quality based on bit errors is a relatively simple task. The sending network equipment sends data over the link, and the receiving network equipment counts the number of bit errors in the received data as a measurement of link or component quality.

Error correcting codes, and in particular, forward error correcting codes, are used by transmitting and receiving network equipment to correct bit errors before the received data is processed by the receiving network equipment. In some FEC codes, parity symbols or check symbols are inserted in transmitted data, and the receiving network equipment uses the parity symbols to correct symbol errors in the received data, where each symbol is a specified number of bits. FEC has become essential in high speed networks, such as 100 gigabit Ethernet networks, to reduce the effects of bit errors on transmitted data and to decrease the cost of transmitting and receiving network equipment. For example, if FEC can correct bit errors in received data, lower-cost components can be used to transmit and receive the data, since the transmission and reception of the data do not need to be completely free of bit errors.

Given the wide use of FEC in current networks, it is desirable to evaluate link or component quality in the presence of FEC. However, evaluating link or component quality in the presence of FEC can be difficult because FEC corrects the underlying bit errors, covering up potential problems with link or component quality.

FEC decoders, such as Reed Solomon FEC decoders, correct bit errors by correcting symbols. Collections of symbols are referred to as codewords. A FEC decoder can correct codewords as long as the number of symbol errors does not exceed a fixed number of codeword errors in the symbol. When the number of codeword errors exceeds the threshold, the codeword is uncorrectable, as it cannot be corrected by the FEC decoder at the receiver. Uncorrectable codeword errors are undesirable because the underlying data is lost.

Link or component quality can be tested by transmitting pseudo-random bit sequences (PRBSs) over the link, counting symbol errors remaining after FEC, and determining whether uncorrectable codeword errors have occurred. However, because the bit error rates are low in the presence of FECs, uncorrectable codeword errors may rarely occur, i.e., on the order of days or even weeks per uncorrectable codeword error. Requiring days or weeks to test link or component quality is undesirable due to the time and labor involved.

In light of these difficulties, there exists a need for improved methods, systems, and computer readable media for evaluating link or component quality.

SUMMARY

A method for evaluating link or component quality using synthetic forward error correction (FEC) includes generating a bit sequence. The method further includes transmitting the bit sequence over a link or through a component under test without adding FEC to the bit sequence. The method further includes receiving a bit sequence transmitted over the link or through the component. The method further includes determining locations of bit errors in the received bit sequence. The method further includes determining locations of synthetic FEC codeword and symbol boundaries in the received bit sequence for the synthetic FEC algorithm against which link or component quality is being evaluated. The method further includes identifying symbol and codeword errors for the synthetic FEC algorithm based on the locations of bit errors in received bit sequence. The method further includes outputting an indication of link or component quality based on the symbol and codeword errors identified for the synthetic FEC algorithm.

A system for evaluating link or component quality using synthetic forward error correction (FEC) includes a bit sequence generator for generating a bit sequence and transmitting the bit sequence over a link or through a component under test without adding FEC to the bit sequence. The system further includes a bit sequence checker for receiving a bit sequence transmitted over the link or through the component and for determining locations of bit errors in the received bit sequence. The system further includes a synthetic FEC codeword boundary locator for determining locations of synthetic FEC codeword and symbol boundaries in the received bit sequence for the synthetic FEC algorithm against which link or component quality is being evaluated. The system further includes a link/component quality metric generator for identifying symbol and codeword errors for the synthetic FEC algorithm based on the locations of bit errors in received bit sequence and outputting an indication of link or component quality based on the symbol and codeword errors identified for the synthetic FEC algorithm.

As used herein, the term "synthetic FEC" or "synthetic FEC algorithm" refers to the process of locating where FEC symbol and codeword boundaries would be in a received bit sequence as if the bit sequence included FEC but that does not include FEC. The locations of the FEC symbol and codeword boundaries may be determined by the symbol size and codeword size of the FEC algorithm against which link or component quality is being evaluated. Because the real or actual FEC algorithm is not implemented, the FEC codeword and symbol boundaries that are located are referred to herein as synthetic FEC codeword and symbol boundaries.

The subject matter described herein for evaluating link or component quality in the using synthetic FEC may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, wherein like reference numerals represent like parts, of which.

DETAILED DESCRIPTION

Figure 1:
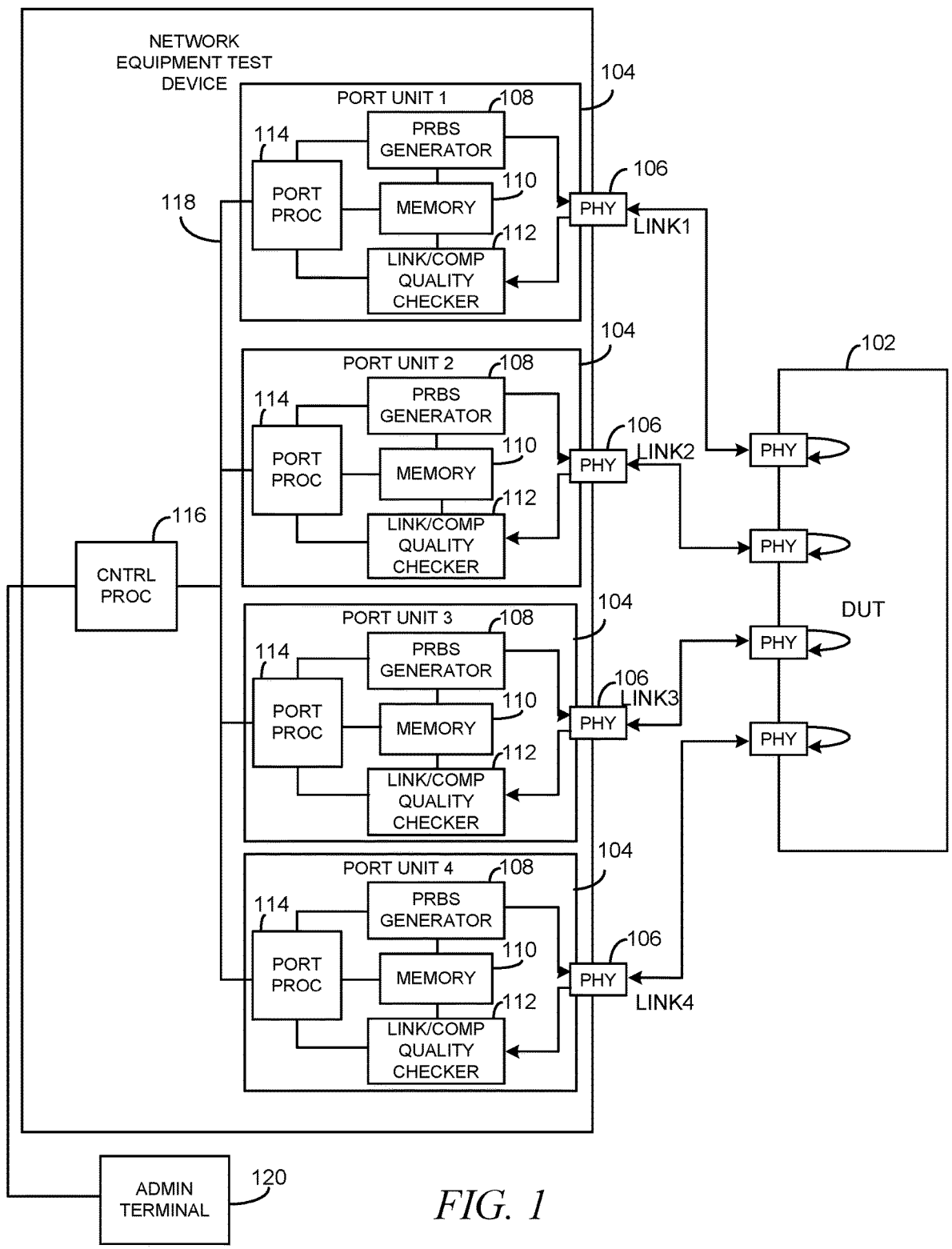
FIG. 1 is a block diagram of a system for evaluating link or component quality using synthetic FEC.

The subject matter described herein includes methods, systems, and computer readable media for evaluating link or component quality using synthetic FEC. FIG. 1 is a block diagram of a system for evaluating link or component quality using synthetic FEC. Referring to FIG. 1, the system includes a network equipment test device 100 configured to generate test frame and transmit the test frames to a device under test 102. Device under test 102 may be any suitable network device that includes networking capabilities. For example, device under test 102 may be a router, a switch, a firewall, or a network address translator.

In the illustrated example, network equipment test device 100 includes a plurality of port units 104 that transmit frames to device under test 102 and receive frames from device under test 102 via physical layer chips 106. Each physical layer chip 106 includes a transmitter for transmitting bit sequences to DUT 102 and a receiver for receiving bit sequences from DUT 102. In one example, each physical layer chip 106 may be implemented using an Ethernet transceiver and the links or components being evaluated for quality include the Ethernet links or components in each physical layer chip 106 that transmit and receive bits over each Ethernet link. As stated above, examples of such components includes SerDes, retimers, and other hardware used to transmit and receive bits.

Each port unit 104 may be implemented as all or part of a printed circuit board mounted in a chassis. In the illustrated example, each port unit 104 includes a bit sequence generator, which in the illustrated example is a pseudo-random bit sequence (PRBS) generator 108, memory 110, a link/component quality checker 112, and a port processor 114. PRBS generator 108 of each port unit generates pseudo-random bit sequences to be transmitted to device under test 102. Physical layer chips 106 package the bit sequences into frames, transmit the frames to device under test 102, receive frames from device under test 102, and unpackage bit sequences from the received frames.

Memory 110 stores test configuration information and test results. Port processor 114 controls the overall operation of each port unit 104. In addition, each port processor 114 may communicate with a control processor 116 over a backplane 118. Control processor 116 may control the overall operation of network equipment test device 100. Control processor 116 may also control communications between admin terminal 120 and port processors 114. Admin terminal 120 may be a general purpose computer through which a test system operator configures network equipment test device 100 and views output generated by network equipment test device 100.

In the illustrated example, physical layer chips 106 of device under test 102 are configured in loopback mode to loop frames received from test device 100 back over the link over which the packets are received. The physical layer chips 106 receive the looped back frames and provide the bit sequences extracted from the frames to a link/component quality checker 112.

Link/component quality checker 112 checks for bit errors in the received unpackaged bit sequences, determine locations of synthetic FEC codeword, FEC symbol, and lane boundaries (described below), and generates an indication of link or component quality based on the locations of the bit errors with respect to the synthetic boundaries The subject matter described herein is not limited to the test setup illustrated in FIG. 1 to evaluate link or component quality. Any suitable test setup where a bit sequence is transmitted over a link or through a component under test, a bit sequence is received from the link or component under test, and the quality of the link or component is evaluated using synthetic FEC is intended to be within the scope of the subject matter described herein. For example, in FIG. 1, transmit side components of each physical layer chip 106 in network equipment test device 100 or in a network device that is not a network equipment test device, such as a switch, a router, or a network card, may be configured to loop a bit sequence back to receive side components of the physical layer chip 106. Link/component quality checkers 112 may be provided to evaluate quality of the components that make up each physical layer chip or interface 106 using synthetic FEC as described herein.

Figure 2:
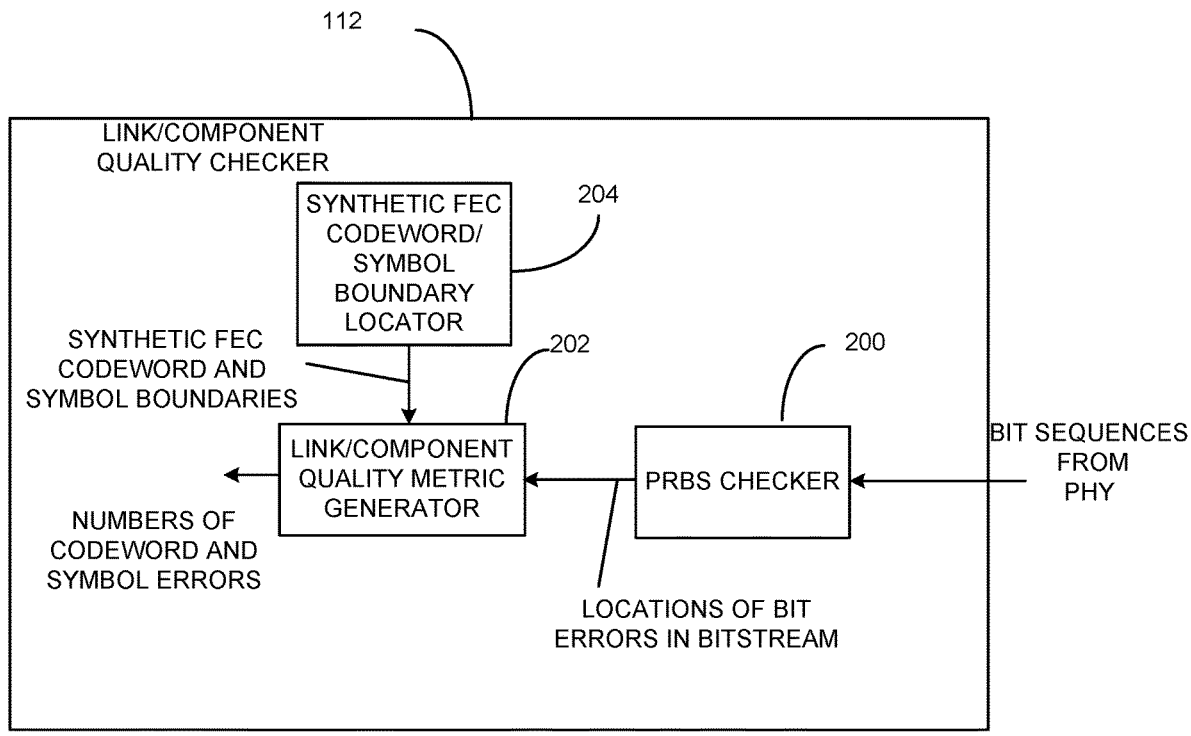
FIG. 2 is a block diagram of a link/component quality checker that uses synthetic FEC to evaluate link or component quality.

FIG. 2 is a block diagram illustrating link/component quality checker 112 in more detail. In FIG. 2, link/component quality checker 112 includes a PRBS checker 200 that receives the bit sequences from links or components whose quality is being evaluated and outputs locations of bit errors in the received bit sequence. A link/component quality metric generator 202 receives as input, the locations of the bit errors from PRBS checker 200 and the locations of synthetic FEC codeword and symbol boundaries from FEC codeword/symbol boundary locator 204 and outputs an indication of link or component quality, such as the numbers of codewords with each of a plurality of different numbers of symbol errors. A synthetic FEC codeword/symbol boundary locator 204 determines where FEC codeword and symbol boundaries would appear in the received bit sequence if FEC had been performed on the received bits. Synthetic FEC codeword/symbol boundary locator 204 may be programmable to synthesize FEC symbol and codeword boundaries for a plurality of different FEC algorithms, symbol sizes, and codeword sizes without requiring that the FEC algorithm be used on the link over which the bits are transmitted. As a result, link or component quality can be tested with respect to a plurality of different FEC algorithms, and errors can be more quickly identified than running tests for one FEC algorithm, detecting codeword errors, and repeating the test for the next FEC algorithm. Using synthetic FEC codeword and symbol boundaries, a single test can be executed, bit error locations can be detected, and the bit error locations can be checked against FEC codeword and symbol boundaries for plural different FEC algorithms, symbol sizes, and codeword lengths.

In FIG. 2, link/component quality metric generator 202 may determine whether a FEC codeword is uncorrectable by counting the number of symbol errors between synthetic FEC codeword boundaries and determining whether the number of symbol errors exceeds the uncorrectable threshold for the FEC algorithm against which link or component quality is being evaluated. Link/component quality metric generator 202 may be configurable with thresholds for the number of symbol errors that will result in a codeword being counted as uncorrectable. In one example, link/component quality metric generator 202 may synthesize symbol boundaries and codeword boundaries for Reed Solomon encoding. In Reed Solomon encoding, a codeword is divided into N total symbols. The N total symbols include K data symbols of S bits each and N–K parity symbols of S bits each. A Reed Solomon decoder can correct up to (N–K)/2 symbol errors. A symbol error is defined as a symbol with one or more bit errors. Reed Solomon encoding can correct a symbol if it has only one bit error or up to the symbol size of bit errors.

Reed Solomon codes are specified in terms of N (the total number of symbols, K, the number of data symbols, and the symbol size). For example, RS (225, 223) with 8 bit symbols means that each codeword contains 255 total codeword bytes of which 223 bytes are data and 32 bytes are parity. For this code:

N=255, K=223, S=8
2T=32, T=16

This means that the decoder can detect up to 16 symbol errors before the codeword will be determined to be uncorrectable. Accordingly, in FIG. 2, link/component quality metric generator may be configured with the N, K, and S parameters for each FEC code against which the link is being evaluated to determine the number of uncorrectable errors.

It should be noted that link/component quality metric generator 202 may detect uncorrectable FEC codeword errors without being required to implement the error locator or error correction polynomials of the FEC decoding algorithm against which the quality of the link is being measured. The locations of the bit errors can be determined by PRBS checker 200 by accessing the transmitted bit values that are supposed to be present in each bit location. After identifying the bit error locations with respect to synthetic codeword and symbol boundaries, link/component quality metric generator 202 may count the number of symbol errors in each codeword and generate corresponding output. In one example, link/component quality metric generator 202 may compare the number of symbol errors in each codeword to the number of symbol errors that would result in an uncorrectable codeword error for each FEC algorithm against which link or component quality is being evaluated. Link/component quality metric generator 202 may count and output the number of symbol errors per codeword, the number of uncorrectable codewords, or other measure of link or component quality.

Figure 3A:
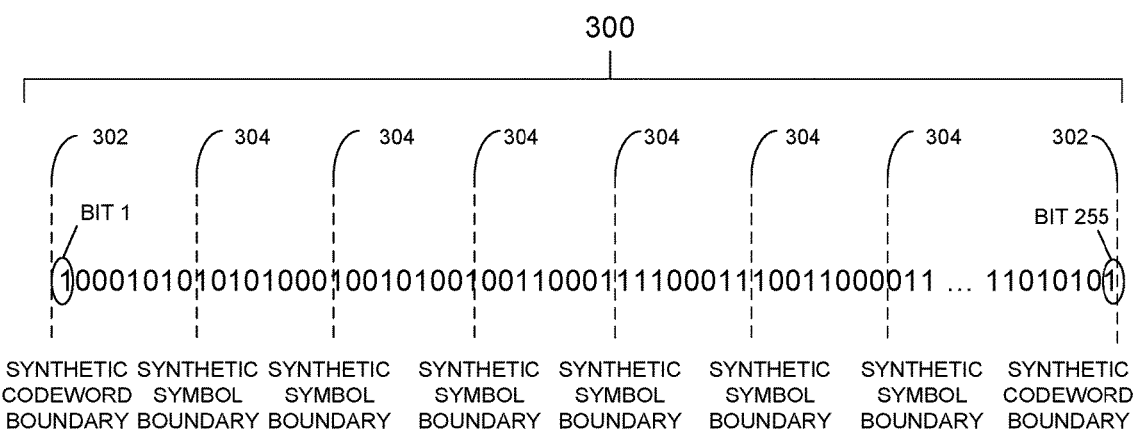
FIG. 3A is a diagram illustrating the use of synthetic FEC codeword and symbol boundaries to evaluate link or component quality.

Thus, if link or component quality is being evaluated against different possible FEC algorithms, a PRBS test may be executed once and the test results may be evaluated against different synthetic FEC codeword, FEC symbol, and lane boundaries to evaluate how the link or component would perform against different FEC algorithms and line speeds. FIG. 3A illustrates exemplary synthetic FEC codeword and symbol boundaries that may be inserted or located by synthetic FEC codeword/symbol boundary locator 204.

In FIG. 3A, a received bit sequence 300 includes a bit sequence that is received from a device under test. FEC codeword/symbol boundary locator 204 determines the locations of synthetic FEC symbol boundaries and synthetic FEC codeword boundaries in received bit sequence 300. In the illustrated example, it is assumed that each symbol has 8 bits and that the codeword size is 255 symbols. Accordingly, synthetic FEC codeword/symbol boundary locator 204 may determine that synthetic FEC codeword boundaries 302 occur before bit 1 and after bit 255. Since the symbol size is 8, FEC codeword/symbol boundary locator 204 may determine that synthetic FEC symbol boundaries 304 are located after every eighth bit from the beginning of the codeword. Using synthetic FEC codeword boundaries 302 and synthetic FEC symbol boundaries 304, link/component quality metric generator 202 may determine based on the locations of bit errors in bit sequence 300 whether the number of symbol errors exceeds the threshold to make the codeword uncorrectable. In this example, it is assumed that the transmitted bit sequence is being evaluated based on whether 16 symbol errors can be corrected. Accordingly, link/component quality metric generator 202 counts the number of synthetic FEC symbols with one or more bit errors. As used herein, the term "synthetic FEC symbols" refers to a sequence of bits being tested that occur between a set of synthetic FEC symbol boundaries. Similarly, the term "synthetic FEC codeword" refers to sequence of bits being tested that occur between a set of synthetic FEC codeword boundaries. If the number of synthetic symbols with one or more bit errors is less than or equal to 16, then the FEC codeword may be marked as correctable. If the number of synthetic FEC symbols with one more bit errors is greater than 16, link/component quality metric generator 202 may indicate that the codeword is uncorrectable.

Figure 3B:
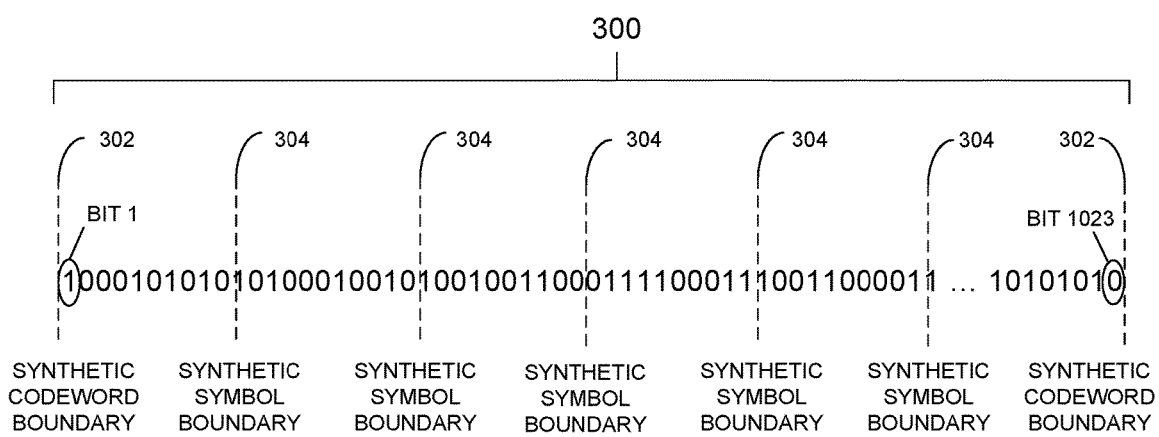
FIG. 3B is a diagram illustrating the use of synthetic FEC codeword and symbol boundaries to evaluate link or component quality where the synthetic FEC codeword and symbol boundaries are different from those illustrated in FIG. 3A.

In order to test the quality of the link using a different FEC algorithm, rather than rerunning the test by transmitting bits to the link or component under test, receiving the bits, and then testing the received bits, the same received bits used to evaluate link or component quality with respect to the first FEC algorithm may be reanalyzed with different synthetic FEC symbol and/or codeword boundaries corresponding to the different FEC algorithm. For example, as illustrated in FIG. 3B, the same received bit sequence 300 is analyzed. In this example, it is assumed that the FEC algorithm being implemented is 10 bits instead of 8 bits. Accordingly, the maximum length of the FEC codeword is $N=2^{10}-1=1023$ bits. FEC codeword/symbol boundary locator 204 will thus locate synthetic FEC codeword boundaries 302 before the first bit and after the 1023 bit in the bit sequence. FEC codeword/symbol boundary locator will then determine that synthetic FEC symbol boundaries occur every 10 bits after the first bit. Link/component quality metric generator 202 will then count the number of symbol errors and determine whether the number of symbol errors exceeds the threshold for the FEC algorithm with 123 bits. In this example, it is assumed that 128 parity symbols are used. Thus, assuming Reed Solomon encoding, the number of symbol errors that can be collected is 128/2 or 64. If the number of symbol errors exceeds the threshold, link/component quality metric generator 202 indicates that the codeword is uncorrectable. If the number of symbol errors does not exceed the threshold, link/component quality metric generator 202 may indicate that the codeword is correctable. Thus, by simply changing the synthetic FEC codeword and symbol boundaries, multiple tests can be run on the same received data stream to evaluate the quality of the link with respect to different FEC algorithms but without requiring that the algorithms themselves be run on the data.

In addition to testing link or component quality against multiple FEC algorithms, the subject matter described herein may also be utilized to determine link or component quality for different data transmission speeds by using different synthetic lane widths and/or different numbers of lanes to evaluate received data. In Ethernet transmissions, data can be divided into electrical lanes, which are multiplexed onto a different number of optical lanes and transmitted over a link. For example, 100 gigabit Ethernet consists of 10 10 Gb/s electrical lanes. 40 gigabit Ethernet consists of 4 10 Gb/s electrical lanes. 25 Gb/s Ethernet consists of a single 25 Gb/s electrical lane. The number of bits per lane per time period is referred as the lane width. Synthetic lane boundaries may be used to simulate different transmission speeds by setting the synthetic lane boundaries to different lane widths.

Figure 4A:
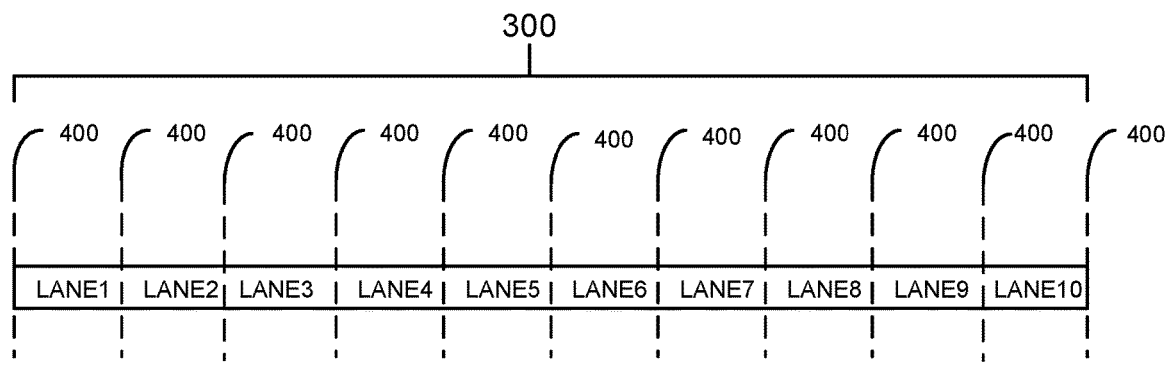
FIG. 4A is a diagram illustrating the evaluation of link or component quality using synthetic lane boundaries.
Figure 4B:
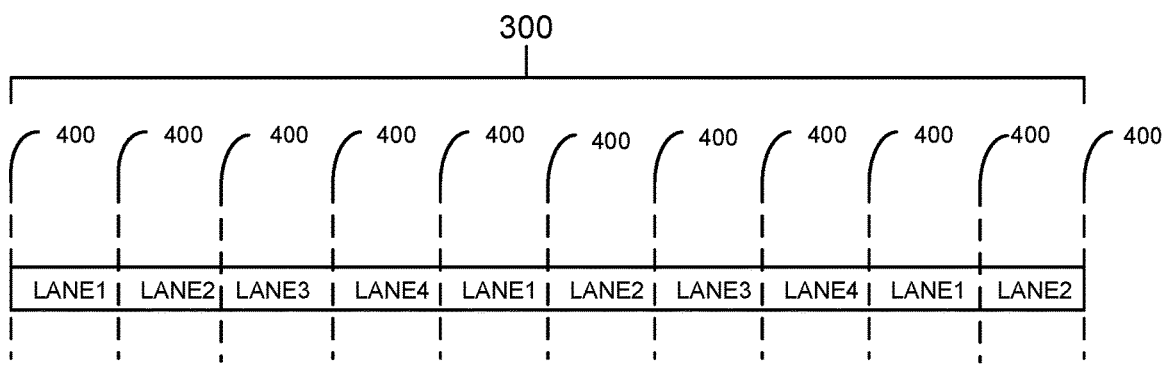
FIG. 4B is a diagram illustrating evaluating link or component quality using different synthetic lane boundaries from the example Illustrated in FIG. 4A.

FIGS. 4A and 4B illustrate the insertion of different synthetic lane boundaries in a received bit sequence to evaluate link or component quality. Referring to FIG. 4A, it is assumed that received bit sequence 300 is a 100 gigabit Ethernet data stream, which is divided into 10 electrical lanes of 10 gigabits per second each. Accordingly, received bit sequence 300 is divided into 10 lanes of data by inserting or locating synthetic lane boundaries 400 in the bit sequence at locations corresponding to the lane width for 100 Gb Ethernet. For each synthetic lane, synthetic FEC codeword and symbol boundaries as Illustrated in FIG. 3A or 3B can be inserted such that link or component quality is tested on a per lane basis using the method described above with regard to FIGS. 3A and 3B.

FIG. 4B illustrates the insertion of synthetic lane boundaries that divides received bit sequence 300 into repeating sequences of four 10 Gb/s lanes, which may be used to evaluate a link or component as if the link or component were transmitting 40 Gb Ethernet, which consists of 4 lanes of 10 gigabits per second each. Thus, the data Illustrated in FIG. 4B is divided into four lanes by synthetic lane boundaries 400. The lane widths are the same as those illustrated in FIG. 4A, but the number of lanes is 4 instead of 10. For each synthetic lane, synthetic FEC codeword and symbol boundaries can be inserted. Link or component quality can then be evaluated on a per lane basis using the method described above with regard to FIGS. 3A and 3B.

Thus, in one example, link/component quality metric generator 202 is configured to output a first instance of an indication of link or component quality for a first synthetic lane width and number of lanes corresponding to a first data transmission rate and to output a second instance of the indication of link or component quality using a second synthetic lane width or number of lanes different from the first synthetic lane width or number of lanes and the same received bit sequence used to output the first instance of the indication of link or component quality.

Figure 5:
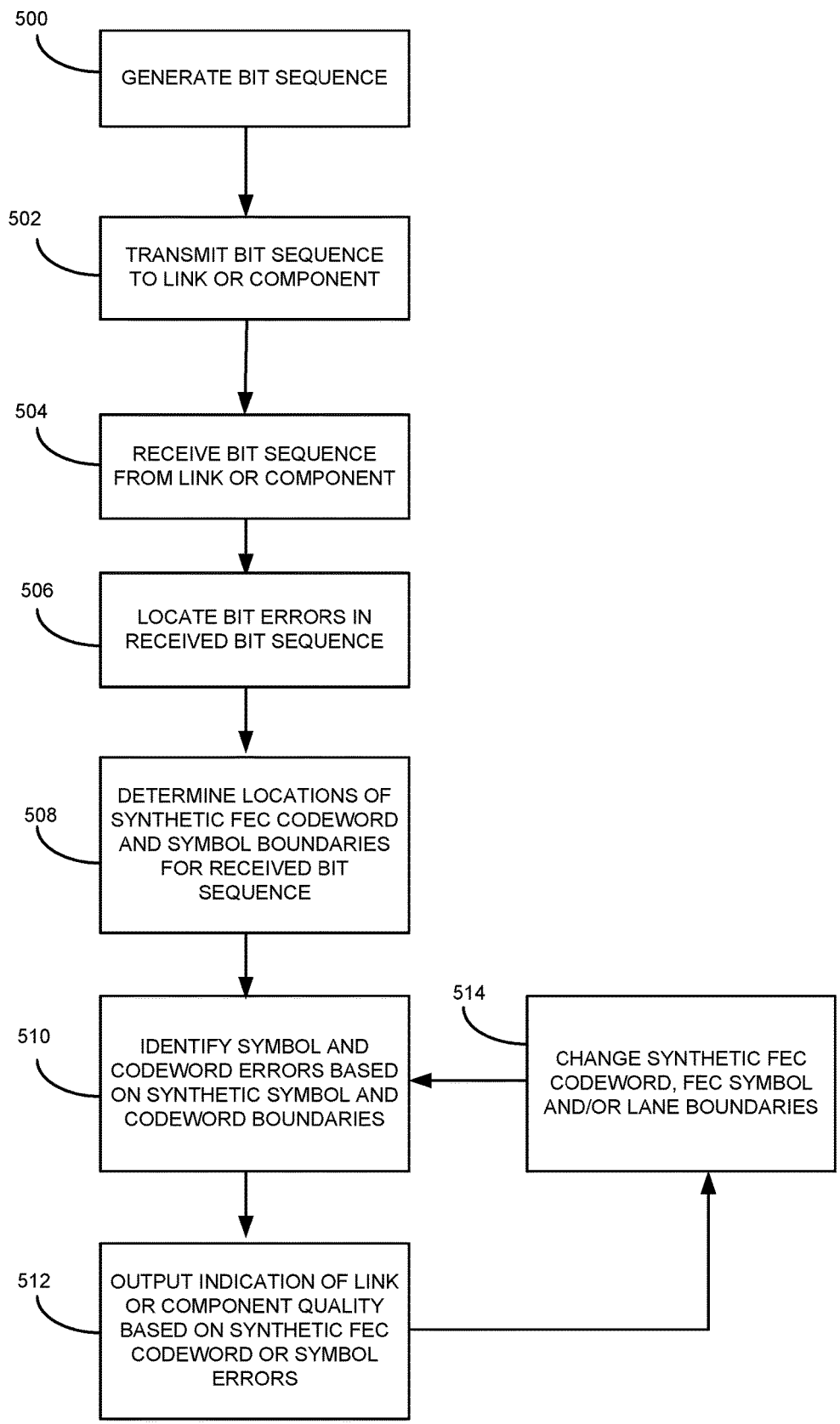
FIG. 5 is a flow chart illustrating an exemplary process for evaluating link or component quality using synthetic FEC.

FIG. 5 is a flow diagram illustrating an exemplary process for evaluating link or component quality using synthetic FEC codeword boundaries. Referring to FIG. 5, in step 500, a bit sequence is generated. For example, PRBS generator 108 illustrated in FIG. 1 may generate a pseudo-random bit sequence and transmit it to a link or component to be tested.

In step 502, the bit sequence may be transmitted over the link or through the component being tested. For example, PRBS generator 108 may send the pseudorandom bit sequence over physical link to a device or component under test.

In step 504, a bit sequence is received from the link or component being tested. For example, link/component quality checker 112 may receive a bit sequence from device under test 102. In step 506, the locations of bit errors in the received bit sequence are determined. For example, link/component quality checker 112 may locate bit errors in the received data by comparing the received data bits to known transmitted bit sequences.

In step 508, the locations for synthetic FEC codeword boundaries for the received bit sequence are determined. For example, FEC codeword/symbol boundary locator 204 illustrated in FIG. 2 may determine where to insert or locate synthetic FEC codeword boundaries, synthetic FEC symbol boundaries and synthetic lane boundaries in the transmitted bit sequence based on the Ethernet speed and FEC algorithm against which link or component quality is being tested. Examples of synthetic FEC codeword and symbol boundaries are shown in FIGS. 3A and 3B. Examples of synthetic lane boundaries are illustrated in FIGS. 4A and 4B.

In step 510, it is determined, based on the bit error locations with respect to the synthetic FEC codeword, FEC symbol, and lane boundaries whether the bit errors would result in uncorrectable codeword errors. For example, link/component quality metric generator 202 may count the number of symbol errors and determine whether the number of symbol errors exceeds the threshold for the FEC algorithm against which link or component quality is being evaluated. If the number of symbol errors exceeds the threshold, the codeword being tested may be indicated as uncorrectable. If the number of symbol errors does not exceed the threshold, the codeword may be identified as correctable.

Figure 6:
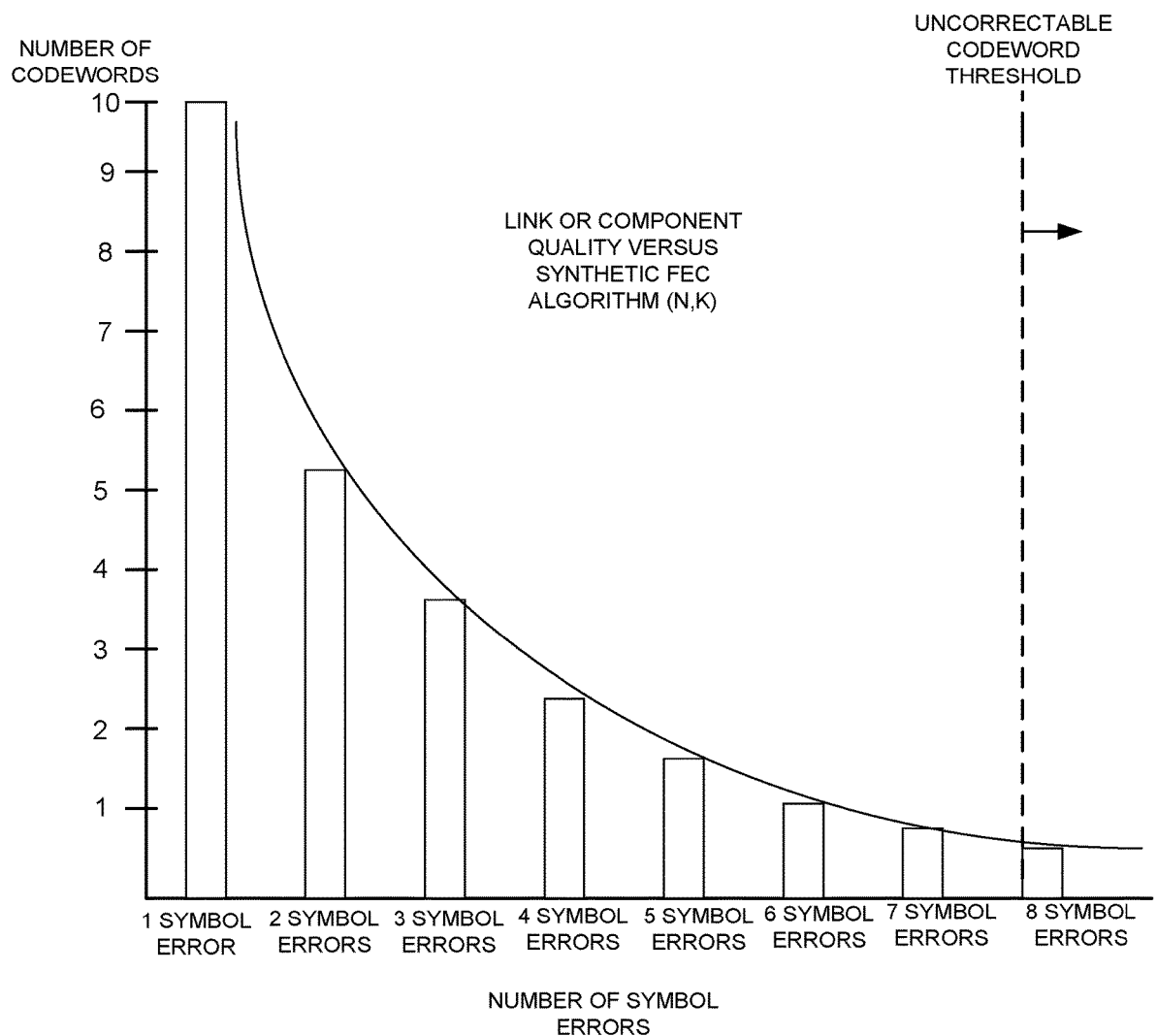
FIG. 6 is a graph illustrating exemplary output that may be produced by a system for evaluating link or component quality using synthetic FEC.

In step 512, an indication of link or component quality is output. FIG. 6 illustrates an example of histogram that may be output by link/component quality metric generator or by software executing on network equipment test device 100. In FIG. 6, the output is a histogram of the number of codewords received with a given number of symbol errors. In the illustrated example, the number of codewords with increasing numbers of symbol errors decreases logarithmically. Once the number of symbol errors in a given codeword exceeds $(N-K)/2$, where $N-K$ is the number of parity symbols, the codeword is uncorrectable. In the illustrated example, it is assumed that $(N-K)/2=8$, such that codewords with 8 or more symbol errors are identified as uncorrectable. Indications of link or component quality versus different synthetic FEC algorithms can be generated by changing the synthetic FEC codeword and symbol boundaries, determining the locations of symbol errors with respect to the new boundaries, and evaluating the number of symbol with respect to uncorrectable codeword thresholds. It is not necessary to retransmit and test new data to evaluate link or component performances with respect to different FEC algorithms or link speeds.

Returning to FIG. 5, in step 514, the synthetic FEC codeword, FEC symbol, and/or lane boundaries is changed and steps 508-512 are repeated to evaluate quality of the link or component based on the changed synthetic FEC codeword, FEC symbol or lane boundaries. It is not necessary to retransmit the bits and it is not necessary to re-determine the locations of the bit errors. Accordingly, using the steps illustrated in FIG. 5, a link or component can be evaluated for quality against plural different FEC algorithms and transmission speeds but only requiring a single uncorrected transmission of data to occur.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for evaluating link or component quality using synthetic forward error correction (FEC), the method comprising:
    generating, by a bit sequence generator, a bit sequence;
    transmitting, by the bit sequence generator, the bit sequence over a link or through a component under test without adding FEC to the bit sequence;
    receiving, by a bit sequence checker, a bit sequence transmitted over the link or through the component;
    determining, by the bit sequence checker, locations of bit errors in the received bit sequence;
    determining, by a synthetic FEC codeword/symbol boundary locator, locations of synthetic FEC codeword and symbol boundaries in the received bit sequence for a first synthetic FEC algorithm against which link or component quality is being evaluated;
    identifying, by a link/component quality metric generator, symbol and codeword errors for the first synthetic FEC algorithm based on the locations of bit errors in received bit sequence; and
    outputting, by the link/component quality metric generator, an indication of link or component quality based on the symbol and codeword errors identified for the first synthetic FEC algorithm.

2. The method of claim 1 the bit sequence comprises a pseudo-random bit sequence.

3. The method of claim 1 wherein transmitting the bit sequence over a link or through a component comprises transmitting the bit sequence over an Ethernet link.

4. The method of claim 1 wherein determining the locations of bit errors in the received bit sequence includes comparing the received bit sequence to a known transmitted bit sequence and determining a location of each bit error in the received bit sequence.

5. The method of claim 1 wherein determining locations of the synthetic FEC codeword and symbol boundaries includes determining locations between bits in the received bit sequence where FEC codeword and symbol boundaries would occur if FEC was implemented for the received bit sequence.

6. The method of claim 1 wherein outputting an indication of link or component quality includes counting numbers of codewords with each of a plurality of different numbers of symbol errors.

7. The method of claim 6 outputting an indication of link or component quality includes outputting a number of uncorrectable codewords.

8. The method of claim 1 comprising changing the synthetic FEC codeword and symbol boundaries to evaluate the link or component quality with respect to a second synthetic FEC algorithm different from the first synthetic FEC algorithm and outputting an indication of link or component quality for second synthetic FEC algorithm using the same received bit sequence used to evaluate the link or component quality with respect to the first synthetic FEC algorithm.

9. The method of claim 1 wherein outputting the indication of link or component quality with respect to the first synthetic FEC algorithm includes outputting a first instance of the indication of link or component quality using a first synthetic lane width and number of lanes corresponding to a first data transmission rate and outputting a second instance of the indication of link or component quality for a second synthetic lane width or number of lanes different from the first lane width or number of lanes using the same received bit sequence used to output the first instance of the indication of link or component quality.

10. A system for evaluating link or component quality using synthetic forward error correction (FEC), the system comprising:
    a bit sequence generator for generating a bit sequence and transmitting the bit sequence over a link or through a component under test without adding FEC to the bit sequence;
    a bit sequence checker for receiving a bit sequence transmitted over the link or through the component and for determining locations of bit errors in the received bit sequence;
    a synthetic FEC codeword/symbol boundary locator for determining locations of synthetic FEC codeword and symbol boundaries in the received bit sequence for a first synthetic FEC algorithm against which link or component quality is being evaluated; and
    a link/component quality metric generator for identifying symbol and codeword errors for the first synthetic FEC algorithm based on the locations of bit errors in received bit sequence and outputting an indication of link or component quality based on the symbol and codeword errors identified for the first synthetic FEC algorithm.

11. The system of claim 10 the bit sequence checker comprises a pseudo-random bit sequence checker.

12. The system of claim 10 wherein transmitting the bit sequence over a link or through a component comprises transmitting the bit sequence over an Ethernet link.

13. The system of claim 10 wherein determining the locations of bit errors in the received bit sequence includes comparing the received bit sequence to a known transmitted bit sequence and determining a location of each bit error in the received bit sequence.

14. The system of claim 10 wherein determining locations of the synthetic FEC codeword and symbol boundaries includes determining locations between bits in the received bit sequence where FEC codeword and symbol boundaries would occur if FEC was implemented for the received bit sequence.

15. The system of claim 10 wherein outputting an indication of link or component quality includes counting numbers of codewords with each of a plurality of different numbers of symbol errors.

16. The system of claim 15 wherein outputting an indication of link or component quality includes outputting a number of uncorrectable codewords.

17. The system of claim 10 wherein the synthetic FEC codeword/symbol boundary locator is configured to change at least one of the synthetic FEC codeword and symbol boundaries and wherein the link/component quality metric generator is configured to evaluate the link or component quality with respect to a second synthetic FEC algorithm different from the first synthetic FEC algorithm, and output an indication of link or component quality for second synthetic FEC algorithm using the same received bit sequence used to evaluate the link or component quality with respect to the first synthetic FEC algorithm.

18. The system of claim 10 wherein the link/component quality metric generator is configured to output a first instance of the indication of link or component quality for a first synthetic lane width and number of lanes corresponding to a first data transmission rate and to output a second instance of the indication of link or component quality using a second synthetic lane width or number of lanes different from the first synthetic lane width or number of lanes and the same received bit sequence used to output the first instance of the indication of link or component quality.

19. A non-transitory computer readable medium having stored thereon executable instructions that when executed by a processor of a computer control the computer to perform steps comprising:
   generating a bit sequence;
   transmitting the bit sequence over a link or through a component under test without adding FEC to the bit sequence;
   receiving a bit sequence transmitted over the link or through the component;
   determining locations of bit errors in the received bit sequence
   determining locations of synthetic FEC codeword and symbol boundaries in the received bit sequence for a synthetic FEC algorithm against which link or component quality is being evaluated;
   identifying symbol and codeword errors for the synthetic FEC algorithm based on the locations of bit errors in received bit sequence; and
   outputting an indication of link or component quality based on the symbol and codeword errors identified for the synthetic FEC algorithm.

\* \* \* \* \*